No. 619,876. Patented Feb. 21, 1899.
M. H. DORGAN.
WATER HEATING APPARATUS.
(Application filed Feb. 10, 1898.)
(No Model.)
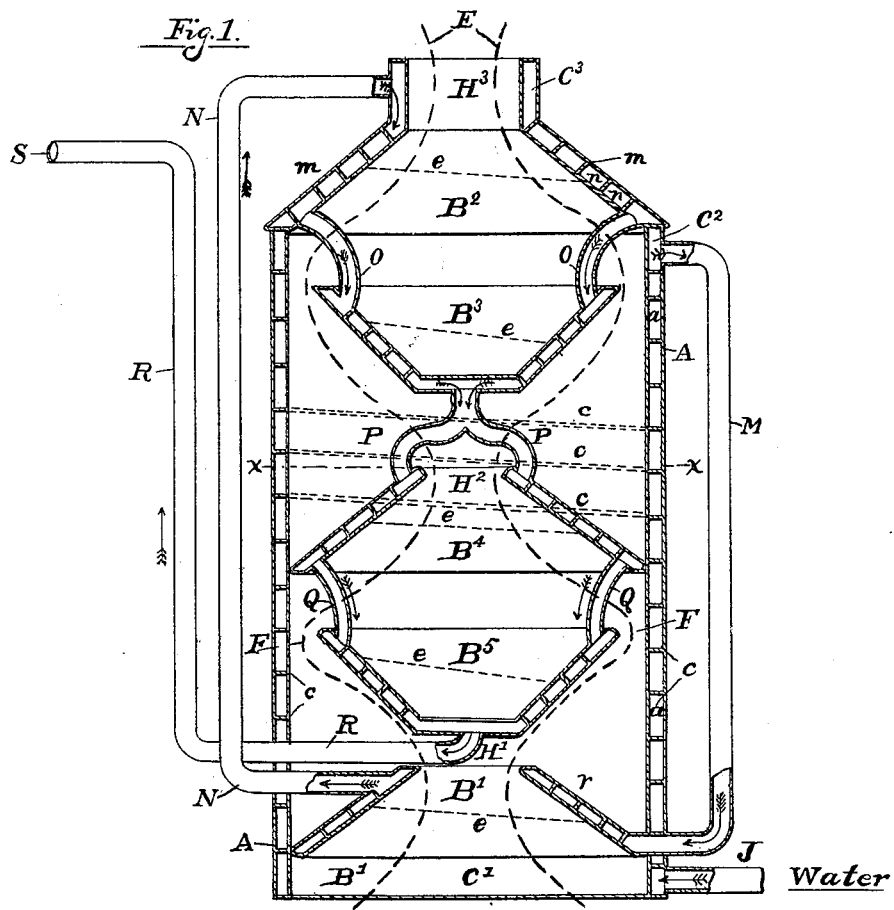
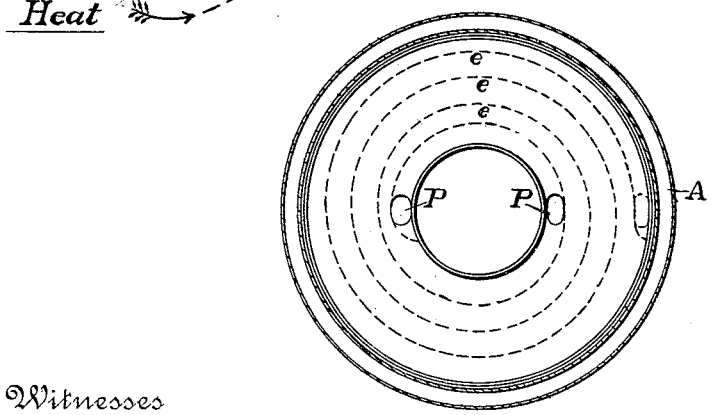
Witnesses
K. Lockwood Nevins.
W. T. Grover
Inventor
Michael H. Dorgan.
By his Attorneys
J. Richards

UNITED STATES PATENT OFFICE.

MICHAEL H. DORGAN, OF SAN FRANCISCO, CALIFORNIA.

WATER-HEATING APPARATUS.

SPECIFICATION forming part of Letters Patent No. 619,876, dated February 21, 1899.

Application filed February 10, 1898. Serial No. 669,810. (No model.)

*To all whom it may concern:*

Be it known that I, MICHAEL H. DORGAN, a citizen of the United States, and a resident of the city and county of San Francisco, State of California, have invented certain new and useful Improvements in Water-Heating, of which the following is a specification.

My invention relates to water-heating for domestic and other purposes by means of self-contained apparatus provided with direct and spiral water-ducts of nearly uniform section that cause continuous circulation without change of velocity and a cumulative absorption of heat by the water as it is circulated, the relations being such that its temperature rises proportionately as the intensity of the heat increases.

My invention also includes various features of construction and arrangement that will be pointed out in the specification and the claims at the end thereof.

Referring to the drawings herewith and forming a part of this specification, Figure 1 is a diagram, mainly in section, illustrating a water-heating apparatus embodying my invention. Fig. 2 is a section on the line $x\,x$ in Fig. 1.

Similar letters of reference indicate corresponding parts in the two figures of the drawings.

Referring first to constructive features, A is a main vessel or drum having double walls, forming an annulus $a$, in which the initial stage of heating is performed. In this annulus $a$ is a spiral rib $c$, that extends from the chamber C' at the bottom to the chamber $C^2$ at the top, as indicated by the dotted lines and sectional view, forming a helical path for the water as it flows upward therein. On the top of this main vessel A is placed a conical-formed vessel $B^2$, also with double walls, and provided with a continuous spiral division $m$ and helical passage $n$, the same as in the main vessel A and as indicated by the diagonal dotted line $e$ in Fig. 1 and the spiral dotted line $e$ in Fig. 2, forming a continuous duct for water from the top to the bottom, as will hereinafter be more fully explained.

Suspended from the vessel $B^2$ and within the main vessel A is a series of cumulative heating chambers or vessels $B^3\,B^4\,B^5$, all communicating by means of the double or branch pipes O, P, and Q, preferably one at each side, forming supporting connections as well as water-ducts between the vessels $B^2\,B^3\,B^4\,B^5$, as seen in Fig. 1.

The inverted chambers $B^3$ and $B^5$ are closed at the bottom, and the other chambers B', $B^2$, and $B^4$ are open at the top to permit the passage of heat through the center and around the outside alternately, as indicated by the dotted lines E, and marked "Heat," in the drawings.

Heat is applied beneath the main vessel A, as indicated, and may be derived from a lamp, gas-burners, or a furnace, according to the size of the apparatus and the conditions of its use. The flame and hot gases first passing through the vessel B' and impinging on the bottom of the vessel $B^5$ are then deflected outward against the inner walls of the main vessel A at F, passing around the vessel $B^5$, and then through the vessel $B^4$, and so on to escape at the top, as indicated by the dotted lines E, marked "Heat," in Fig. 1.

The number of the conical reheating vessels $B^3\,B^4\,B^5$ may be more or less than is shown, according to the intensity of the heat applied and the temperature of the water required. The arrangement shown will raise water to the boiling-point with a common oil or gas burner, proportioned to the size of the apparatus and the apertures H' $H^2\,H^3$. Following now the course of the water, this enters by the pipe J into the annular chamber C' in the bottom of the main vessel A, then flows helically around this chamber in the spiral passage $a$, formed by the rib or division $c$, up to the annular chamber $C^2$ at the top. From there the water being partially heated or warmed in the main vessel A passes into the pipe M, down and into the bottom of the conical chamber B', then upward around the helical waterway $r$ in this chamber, and out at the pipe N, up this pipe, and into the annular chamber $C^3$ at the top. From this chamber $C^3$ the water descends, traversing the spiral waterway $n$ around the vessel $B^2$ and flowing through the two pipes O into the vessel $B^3$, then around a similar spiral passage in that vessel, and through the pipes P into the conical vessel $B^4$, on through the spiral passage in this vessel, and down through the two pipes Q into the final heating vessel $B^5$, and after traversing the spiral way in that vessel flows out at the pipe R and is discharged at S, which point is preferably above the top of the main vessel A. Retracing this course of the water, it may appear that the first vessel B' will be hotter than those above; but this is not the case in practice, the first one, B', acting mainly to direct the flame or hot gases which rush rapidly through the throat at H' and impinge on the vessel $B^5$, giving up there the most intense heat. In this manner it will be seen that the intensity of the heat diminishes gradually from the first throat H' to the place of escape at $H^3$; also, that the water from the first progresses inversely to the heat—that is, from the lowest to the highest temperature—with a velocity nearly uniform at all points, preventing the deposition of sediment, and in this manner absorbs at all points in its course a uniform or nearly uniform amount of heat.

It is well-known that particles of water when heated and expanded rise through cooler water and that circulation is maintained by this means so long as the section of the waterway or the volume of water remains the same. In the present apparatus the downward flow in the pipe M and from the vessel $B^2$ to the vessel $B^5$ is compensated by the upflow in the pipes R and N, so the whole is in equilibrium, or nearly so, in respect to circulative effort, due to heat, and only a slight pressure is required in the pipe J to cause circulation and discharge at S.

By the spiral ribs introduced in the various chambers and vessels, as hereinbefore described, the water duct or way is lengthened to any desirable extent many times what it would be with this feature omitted. The section is also made uniform, causing a continuous circulation and the avoidance of sediment that collects and clogs such waterways when their area is varied and the water is baffled or moves slowly enough to permit precipitation.

I am aware that conical vessels in series have been employed in water-heating arranged in various ways, but without division of the water into streams of small section and without continuous and uniform circulation, and it is well known that the efficiency of such apparatus depends as much upon circulation and division of the water as on the amount of surface exposed to convection. It is to provide for these conditions that I employ long passages of nearly uniform section to divide the water into a series of streams and maintain circulation without enlargements or eddies that cause precipitation or incrustation of the water-passages.

Having thus described the nature and objects of my invention and the manner of its operation, what I claim as new, and desire to secure by Letters Patent, is—

1. In a water-heater, the main vessel A, provided with an annular water-space and spiral water-passage, at the base thereof a conical double-walled initial heating vessel B', a double-walled conical heating vessel $B^2$ at the top thereof, a pipe connection between said vessel B' and the top of the main vessel, a pipe connection between said vessel B' and vessel $B^2$, and outlets $o, o$, from said vessel $B^2$, substantially as described.

2. In a water-heater, the combination of the outer or main vessel A, the conical double-walled heating vessels B' $B^2$ at the bottom and top of the main vessel, respectively, a pipe connection between said vessel B' and the top of the main vessel, a pipe connection between said vessel B' and vessel $B^2$, intermediate heaters $B^3$, $B^4$, $B^5$, pipe connections between $B^2$ and $B^3$, $B^3$ and $B^4$, $B^4$ and $B^5$ and an outlet-pipe R connected with $B^5$, substantially as described.

3. In a water-heater, the combination of a double-walled main containing vessel, a series of double-walled heating vessels therein, both having spiral passages through which the water circulates, the initial inner heating vessel at the bottom, and the final heating vessel at the top, substantially as described.

4. In a water-heater, the combination of the double-walled main vessel A, having a spiral passage in said wall, conical double-walled heating vessels B' $B^2$, at the bottom and top of said main vessel respectively, a pipe connection from the top of said main vessel to said heating vessel B', a pipe connection from said heating vessel B' to the top of said top heating vessel $B^2$, intermediate conical heating vessels $B^3$, $B^4$ and $B^5$, having double walls with continuous spiral passages therein, pipe connections from said top heating vessel $B^2$ to vessel $B^3$, pipe connections between vessels $B^3$ $B^4$ and $B^5$, an inlet-pipe J, and an outlet-pipe R, substantially as described.

These features I believe to be novel and useful, and ask that Letters Patent be granted therefor.

M. H. DORGAN.

Witnesses:
   JAMES L. KING,
   H. SANDERSON.